Hopson & Brooks,
Wire Pointing Machine,
No. 2 124. Reissued Dec. 12. 1865.
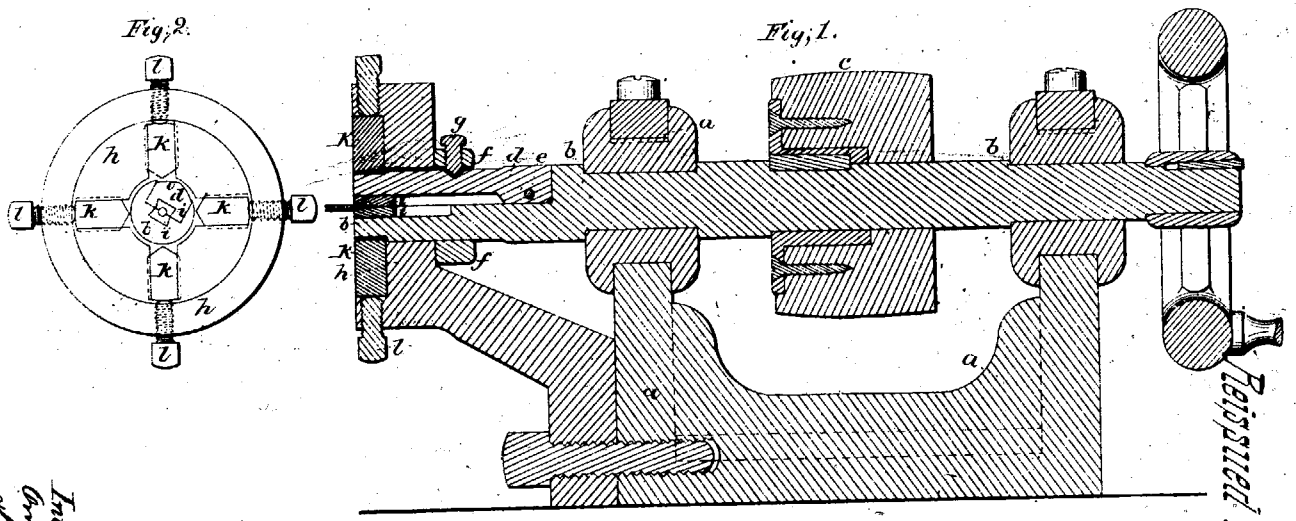
Witnesses;
Theodore S. Sewell
Edward Pickard
Inventors;
Orin S. Hopson
Herman F. Brooks

UNITED STATES PATENT OFFICE.

ORRIN L. HOPSON AND HEMAN P. BROOKS, OF WATERBURY, CONNECTICUT.

MACHINE FOR POINTING WIRE.

Specification forming part of Letters Patent No. 43,772, dated August 9, 1864; Reissue No. 2,124, dated December 12, 1865.

*To all whom it may concern:*

Be it known that we, ORRIN L. HOPSON and HEMAN P. BROOKS, of Waterbury, in the county of New Haven and State of Connecticut, have invented, made, and applied to use a certain new and useful Improvement in Compressing Articles of Metal; and we do hereby declare the following to be a full, clear, and exact description of the said invention, reference being had to the annexed drawings, making part of this specification, wherein—

Figure 1 is a longitudinal section of our device as adapted to pointing wire, and Fig. 2 is an end view representing the cams for actuating the dies employed in compressing the metal.

Similar marks of reference denote the same parts.

Our invention has for its object the compressing of metal to a smooth, round form corresponding to the shape of the dies; and it consists in a divided die that is forced together two or more times during each revolution around the article to be formed, and by a series of compressions upon the sides of such article reduces the same to the size and shape of the opening or cavity of the dies and gives to the metal great density, as well as a smooth, round, and uniform shape; and there is no loss of material like there is in the turning, milling, and grinding operations heretofore pursued, and which do not harden or render the metal dense and strong, and there are no burrs, angles, projections, or roughness on the surface, as heretofore usual with articles struck up in dies.

In the drawings, *a* is the mandrel head or frame carrying the mandrel or shaft *b*, that is driven by competent power applied at the pulley or wheel *c*. Near the end of this shaft *b* is a longitudinal groove or recess receiving the jaw *d*, that is held in place by the cross-pin *e* or other suitable means, so that said jaw *d* can receive a slight swinging or opening movement to receive the wire between the parts on the line of the center or axis of the said shaft *b*.

*f* is a wing around *b* and *d*, with a screw, *g*, passing through the same and entering a cavity in *d*. This screw graduates the amount the jaw *d* can move or open for the admission of the end of the wire or piece of metal to be pointed or compressed.

*i i* are dies formed with an opening of the shape required for forming a point or other circular or round article, and the respective parts of the die are attached to *b* and *d*, so that the cavity in said dies is on the axial line of the shaft *b*. Around the end of this shaft *b* is a stationary ring, *h*, with radial slots receiving the cams *k*, that are adjusted by the screws *l* or other suitable means.

The mode of operating this machine is as follows: The end of the piece of metal to be pointed or otherwise shaped is entered between the dies *i i* and pressed into them, which slightly opens said dies. The revolution of the shaft *b* brings the projection *o* of the jaw *d* into contact with the end of one of the cams *k*, which cam is adjusted so that it will close the dies *i i*, and in so doing compress the wire or metal, and these operations are repeated. The end of the wire or piece of metal being pressed in a little farther each time, the jaw is relieved and allowed to slightly open until the same is perfectly formed or given the shape of the opening in the die, and the metal is compressed and extended without any burr or projection being formed on the same, and the metal is rendered much more dense by this compressing action than it would be if the metal were filed or ground away to the required shape. The screw *g*, regulating the extent to which the metal can open the die each time, prevents injury to the machinery by too great reduction at once.

It will be evident that if only two cams, *k*, were employed they would require to be at right angles to each other, so as to operate on both sides of the wire, and where a larger number of radial cams are used the operation of forming the point will be effected equally fast with a slower rotation of the shaft *b* than in cases where but few of these radiating cams are employed. This mode of pointing has the effect of smoothing the surface acted upon by the rotary movement of the dies.

The mechanism herein set forth may be employed for shaping in a circular form the point of a pin or any other article to which it may be adapted. It will be evident that there is no waste of material, as the metal is compressed and elongated, thus effecting a saving of stock over the methods heretofore pursued and making a much better article.

What we claim, and desire to secure by Letters Patent, is—

1. A divided die fitted and actuated substantially as specified, and operating by a series of compressions upon the article to be formed to give to such article a smooth, round shape, corresponding to the shape of the dies, as set forth.

2. The adjustable radial cams *k*, in combination with the jaw *d*, shaft *b*, and dies *i*, substantially as specified.

3. A divided die in which round or cylindrical articles of metal are compressed, in combination with a screw, or equivalent device, to regulate the opening of the die and the consequent amount of each successive reduction, as set forth.

In witness whereof we have hereunto set our signatures this 24th day of June, A. D. 1865.

ORRIN L. HOPSON,
HEMAN P. BROOKS.

Witnesses:
JOHN O'NEILL, Jr.,
NELSON J. WELTON.